(12) United States Patent
Katougi et al.

(10) Patent No.: US 8,091,240 B2
(45) Date of Patent: Jan. 10, 2012

(54) ASSEMBLING METHOD OF BEARING UNIT

(75) Inventors: Takao Katougi, Kanagawa (JP);
Tomoharu Sugiman, Kanagawa (JP)

(73) Assignee: NSK Ltd., Tokyo (JP)

( * ) Notice: Subject to any disclaimer, the term of this patent is extended or adjusted under 35 U.S.C. 154(b) by 722 days.

(21) Appl. No.: 12/167,960

(22) Filed: Jul. 3, 2008

(65) Prior Publication Data
US 2009/0056135 A1 Mar. 5, 2009

(30) Foreign Application Priority Data

Jul. 4, 2007 (JP) .............................. P. 2007-176120
Aug. 2, 2007 (JP) .............................. P. 2007-201843

(51) Int. Cl.
*B21D 53/10* (2006.01)
*F16C 43/04* (2006.01)

(52) U.S. Cl. .................. 29/898.07; 29/898.066; 29/505; 29/509; 29/520; 29/522.1; 384/523; 384/537; 384/585

(58) Field of Classification Search ............... 29/898.04, 29/898.07, 898.08, 898.066, 505, 507, 509, 29/521, 522.1, 520; 384/477, 484, 537, 547–548, 384/559, 561, 585–588, 596, 607
See application file for complete search history.

(56) References Cited

U.S. PATENT DOCUMENTS

| 7,223,020 | B2 * | 5/2007 | Bauer et al. | 384/535 |
| 2007/0269157 | A1 * | 11/2007 | Fahrni et al. | 384/569 |
| 2010/0119185 | A1 * | 5/2010 | Fischer et al. | 384/517 |

FOREIGN PATENT DOCUMENTS

| DE | 102004031830 A1 | 1/2006 |
| JP | 47-28344 | 11/1972 |
| JP | 1-60024 U | 4/1989 |
| JP | 2003-90350 A | 3/2003 |
| JP | 2004-28123 A | 1/2004 |

OTHER PUBLICATIONS

Notification of Reasons for Refusal dated Jun. 28, 2011 issued in counterpart application No. 2007-201843.
Notification of Reasons for Refusal dated Jun. 28, 2011 issued in counterpart application No. 2007-115312.

* cited by examiner

*Primary Examiner* — Sarang Afzali
(74) *Attorney, Agent, or Firm* — Sughrue Mion, PLLC

(57) ABSTRACT

There is provided an assembling method of a bearing unit which has a bearing having an outer ring and a retainer plate having a retainer hole for holding the outer ring. The assembling method has pressing a plurality of portions in a circumferential direction of a circumferential edge of an inner circumferential portion of the retainer hole of the retainer plate in an axial direction so as to form engagement pawls and moving the engagement pawls of the retainer plate from one axial end of the outer ring to a engagement groove formed on an outer circumferential surface of the outer ring so as to engage the engagement pawls of the retainer plate with the engagement groove of outer ring.

3 Claims, 11 Drawing Sheets

US 8,091,240 B2

ASSEMBLING METHOD OF BEARING UNIT

BACKGROUND OF THE INVENTION

1. Field of the Invention

The present invention relates to a bearing unit used for a rotation supporting portion of, for example, a gear incorporated into a transmission. The present invention also relates to an assembling method of the bearing unit.

2. Description of the Related Art

As for this type bearing unit, as shown in FIG. 12, there is known a bearing unit includes a rolling bearing 4 having a plurality of rolling elements 3 disposed between an inner ring 1 and an outer ring 2 as shown in FIG. 12, and a retainer plate 5 which contacts with an axial end face of the outer ring 2 of the rolling bearing 4 to fix the rolling bearing 4 to a housing H. (For example, see Japanese Patent Unexamined Publication No. JP-A-2004-028123.)

It is demanded to downsize automobiles and at the same time it is demanded to downsize transmissions. In order to meet these demands, there is provided a structure shown in FIG. 13 in which a small diameter step portion 6 is formed in an end axial portion of an outer circumferential face of an outer ring 2 of a rolling bearing 4 and a retainer plate 7 is engaged and fixed to the small diameter step portion 6. (For example, see German Patent Publication DE 102004031830.

In this bearing unit, after the retainer plate 7 has been inserted from the outside into the small diameter step portion 6 of the outer ring 2, a plurality of portions in the circumferential direction of a circumferential edge of an inner circumferential portion of the retainer plate 7 are pressed and deformed in the axial direction. Due to this pressing and deforming work, a plurality of engagement pawls 8, which protrude inside in a radial direction, are formed in a plurality of portions in the circumferential direction in the inner circumferential portion of the retainer plate 7 inserted into the small diameter step portion 6. These engagement pawls 8 are engaged with the engagement groove 9 formed on an outer circumferential face of the small diameter step portion 6.

Compared with the structure in which the retainer plate 5 is contacted with an axial end face of the outer ring 2 shown in FIG. 12, this bearing unit is advantageous in that a size in the axial direction can be reduced and a transmission can be downsized.

However, in the DE102004031830, after the retainer plate 7 has been inserted from the outside, a plurality of portions in the circumferential direction of the circumferential edge of the inner circumferential portion are pressed in the axial direction, so that the engagement pawls 8 engaging with the engagement groove 9 of the outer ring 2 are formed in the inner circumferential portion of the retainer plate 7. Accordingly, it is difficult to check whether or not the engagement pawls 8 are properly formed in the inner circumferential portion of the retainer plate 7. Therefore, the efficiency of the assembling work of the bearing unit is lowered and the productivity is deteriorated.

In the DE102004031830 described above, it is necessary to provide two plastic working steps, one is a step in which the large diameter hole portion 7a is formed by a press machine in the inner circumferential portion of the end axial portion of the retainer plate 7 and the other is a step in which an end face of the large diameter hole portion 7a is pressed and deformed in the axial direction by a press machine. Therefore, the efficiency of the assembling work of the bearing unit is lowered and the productivity is deteriorated.

Further, in the DE102004031830 described above, it is necessary to individually press a plurality of portions in the circumferential direction of the end face of the large diameter hole portion 7a formed on the retainer plate 7 in the axial direction by a press machine. Therefore, the efficiency of the assembling work of the bearing unit is lowered and the productivity is deteriorated. In this connection, it can be considered to form the engagement pawls 8 by pressing a plurality of portions all at once by using an exclusive press machine. However, in this case, it is necessary to newly prepare the exclusive press machine and further, if dimensions of the bearing are changed, it is impossible for this exclusive press machine to cope with the change in the circumstances.

SUMMARY OF THE INVENTION

The present invention has been accomplished to solve the above problems. An object of the present invention is to provide a bearing unit capable of enhancing the productivity by enhancing the efficiency of the assembling work. Another object of the present invention is to provide an assembling method of the bearing unit concerned.

According to an aspect of the present invention, there is provided an assembling method of a bearing unit which includes a bearing having an outer ring and a retainer plate having a retainer hole for holding the outer ring, the assembling method including:

pressing a plurality of portions in a circumferential direction of a circumferential edge of an inner circumferential portion of the retainer hole of the retainer plate in an axial direction so as to form engagement pawls and moving the engagement pawls of the retainer plate from an axial end of the outer ring to an engagement groove formed on an outer circumferential surface of the outer ring so as to engage the engagement pawls of the retainer plate with the engagement groove of outer ring.

From another aspect of the present invention, there is provided an assembling method of a bearing unit which includes a bearing having an outer ring and a retainer plate having a retainer hole for holding the outer ring, the assembling method including:

bringing an axial end face of the retainer plate to contact with an end face of a small diameter step portion provided in an axial end portion of an outer circumferential face of the outer ring and pressing a plurality of portions in a circumferential direction of a circumferential edge of a inner circumferential portion of the retainer hole of the retainer plate against an end face of the small diameter step portion of the outer ring so as to form engagement pawls protruding radially inward to thereby engage the engagement pawls of the retainer plate with an engagement groove continuously provided on an end face of the small diameter step portion of the outer ring.

From still another aspect of the present invention, there is provided an assembling method of a bearing unit which includes a bearing having an outer ring and a retainer plate having a retainer hole for holding the outer ring, the assembling method including:

pressing a plurality of portions in a circumferential direction of a circumferential edge of the inner circumferential portion of the retainer hole of the retainer plate in an axial direction to form protruding portions which protrude from an axial end face of the retainer plate in the axial direction;

bringing the protruding portions of the retainer plate into contact with an end face of a small diameter step portion of the outer ring and pressing the axial end face of the retainer plate against the small diameter portion of the outer ring to form engagement pawls by plastically deforming the protruding portions of the retainer plate radially inward to thereby engage the engagement pawls with the engagement groove.

According to the present invention described above, at the time of assembling the bearing unit, it is unnecessary to check whether or not the engagement pawls are properly formed in the inner circumferential portion of the retainer plate. Accordingly, the efficiency of the assembling work of the bearing unit is enhanced and the productivity can be improved.

BRIEF DESCRIPTION OF THE DRAWINGS

FIG. 4 is a schematic illustration for explaining a step in which an engagement pawl is formed in an inner circumferential portion of a retainer plate.

FIG. 8 is a schematic illustration for explaining a step in which an outer ring of a rolling bearing and a retainer plate are combined with each other.

FIG. 10 is a schematic illustration for explaining a step in which a protruding portion is formed on a retainer plate.

FIG. 11 is a schematic illustration for explaining a step in which an outer ring of a rolling bearing and a retainer plate are combined with each other.

DETAILED DESCRIPTION OF THE PREFERRED EMBODIMENTS

Figure 1:
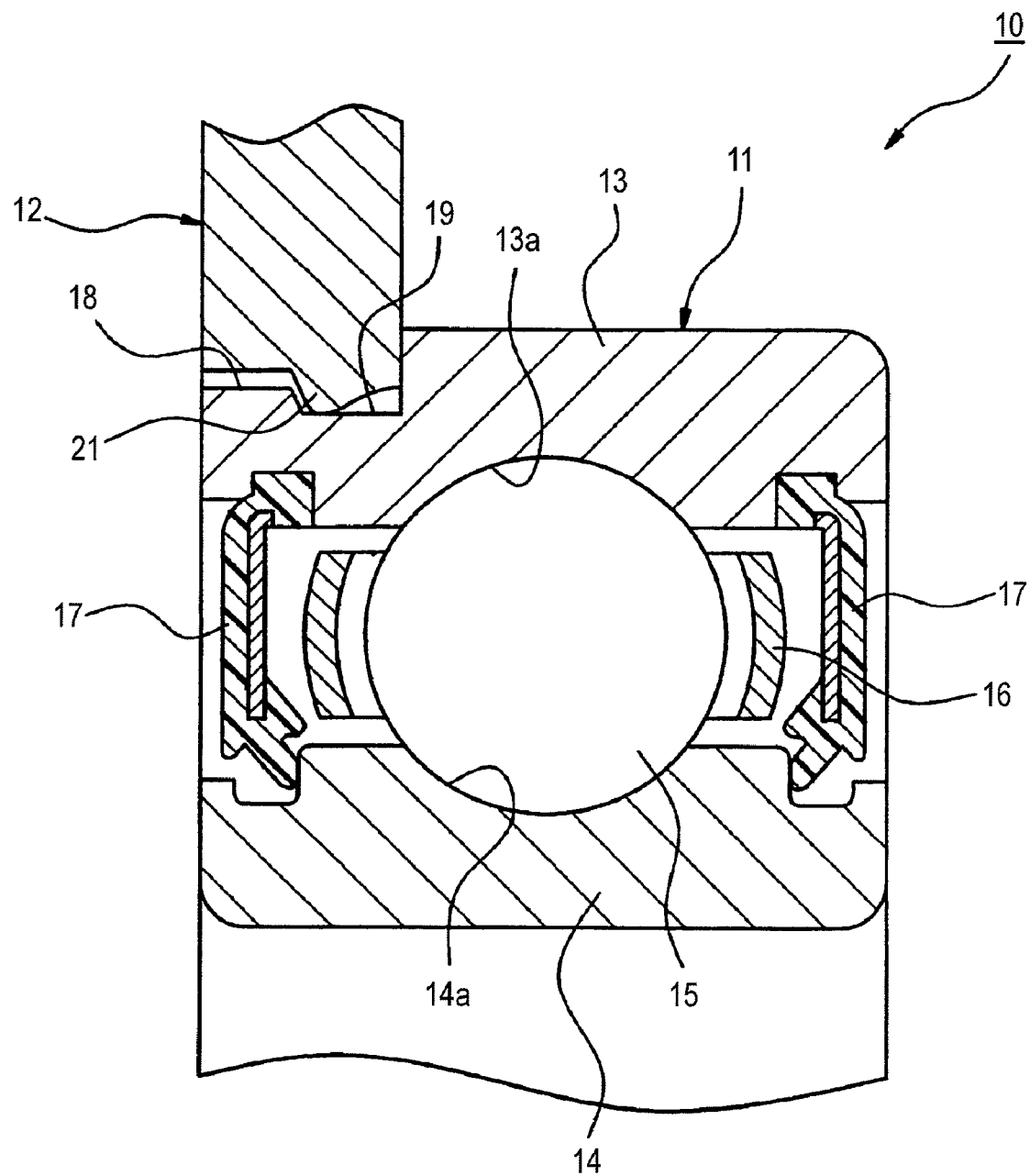
FIG. 1 is a sectional view showing a main portion for explaining an embodiment of the bearing unit of the present invention.

Referring to the drawings, an embodiment of the bearing unit of the present invention will be explained in detail below.

First Embodiment

FIGS. 1 to 6 are views showing the first embodiment of the present invention.

Figure 2:
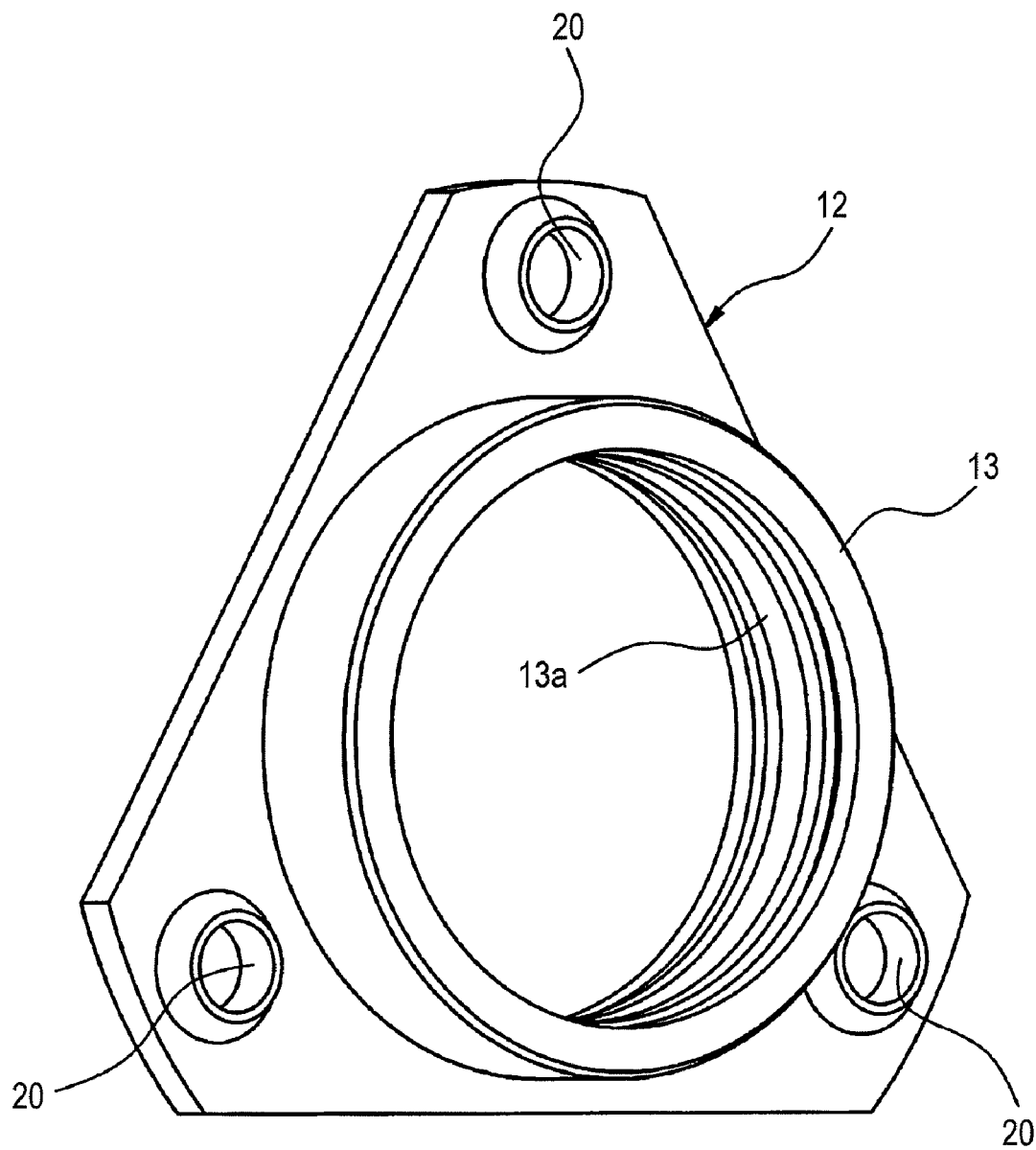
FIG. 2 is a perspective view showing a state in which a retainer plate is engaged and fixed onto an outer circumferential face of a small diameter step portion of an outer ring.
Figure 3:
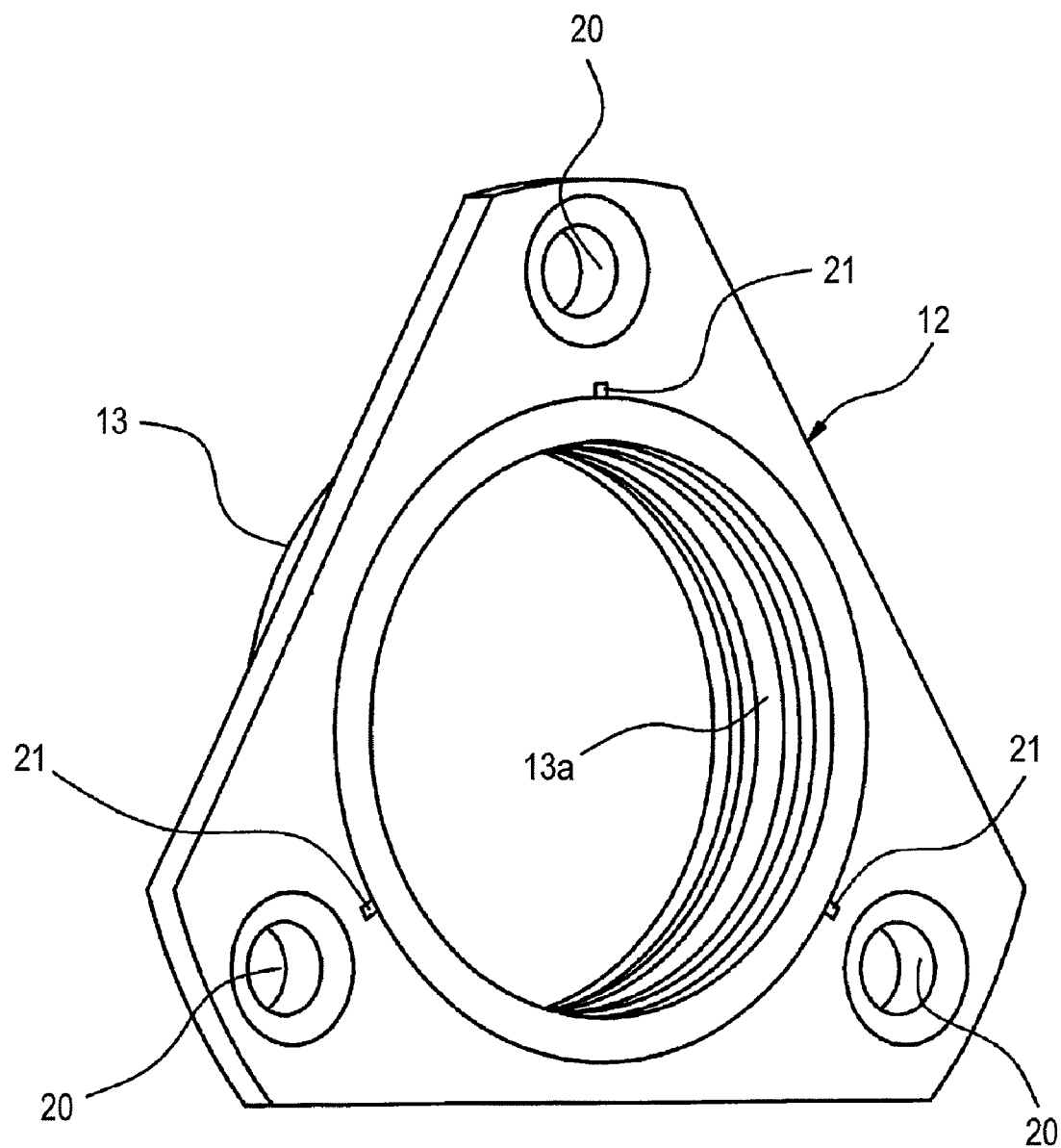
FIG. 3 is a perspective view taken from the back side of FIG. 2.
Figure 4A:
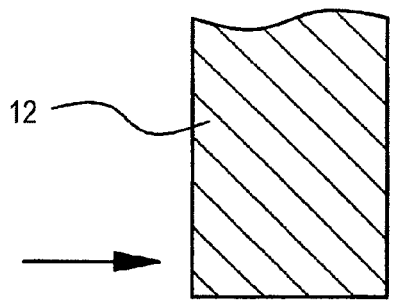
FIG. 4A is a sectional view of a main portion showing a state of a retainer plate before an engagement pawl is formed.
Figure 4B:
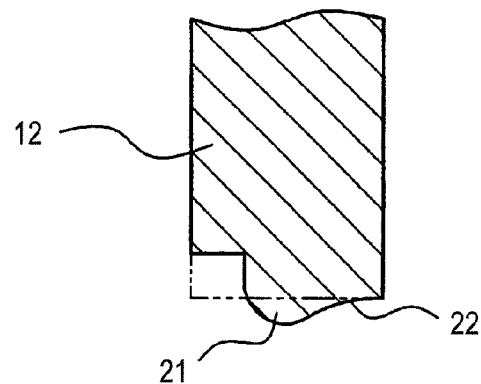
FIG. 4B is a sectional view of a main portion showing a state of a retainer plate after an engagement pawl is formed.
Figure 5:
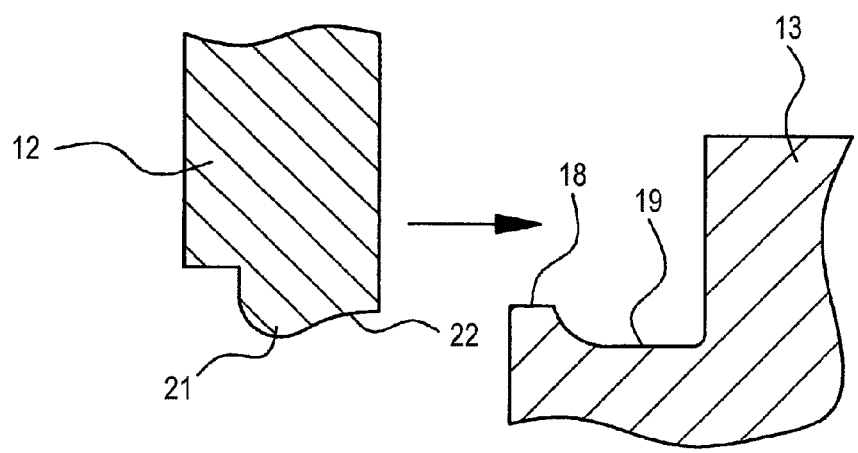
FIG. 5 is a sectional view of a main portion for explaining a step in which a retainer plate is engaged with a small diameter step portion of an outer ring.
Figure 6:
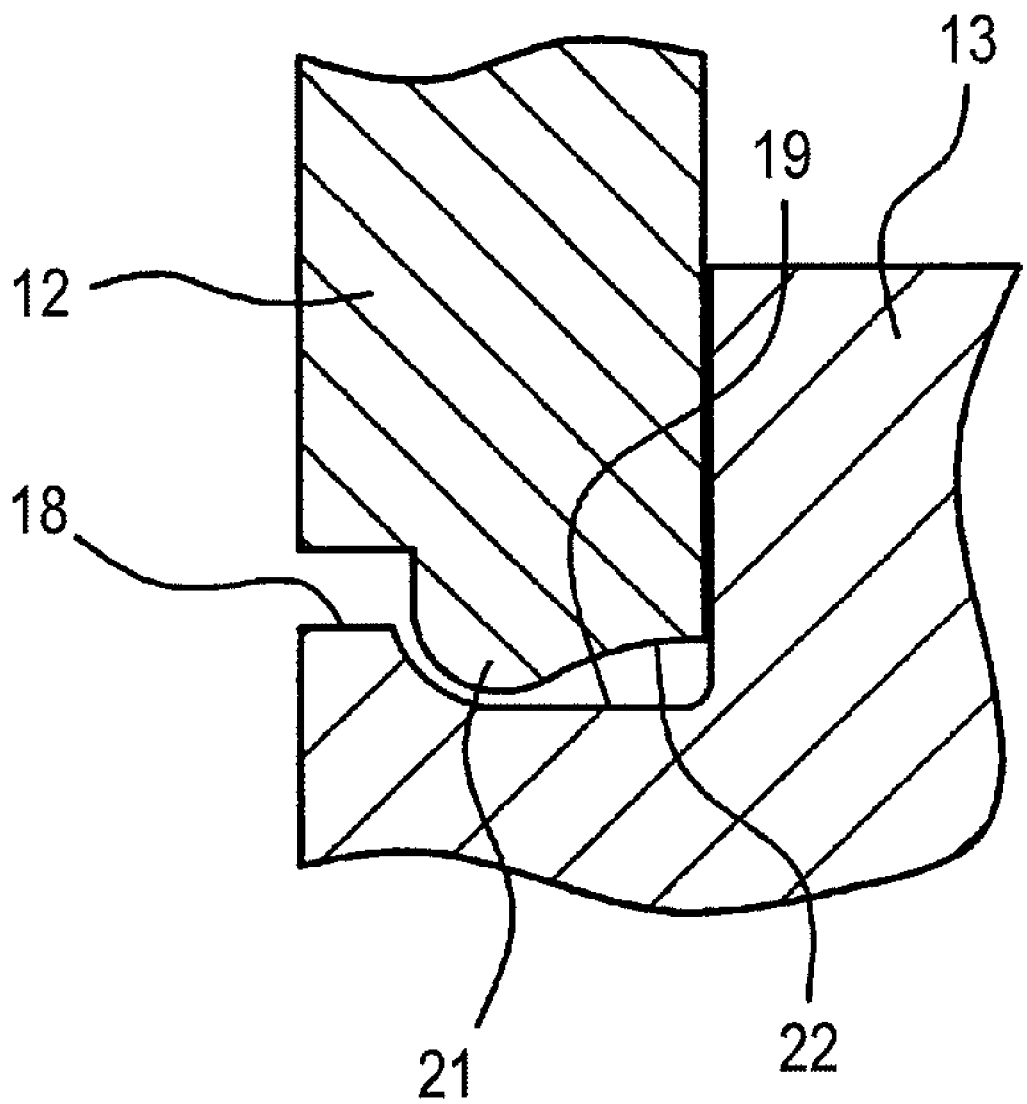
FIG. 6 is a sectional view of a main portion for explaining a state in which an engagement pawl of a retainer plate is engaged with an engagement groove of an outer ring.

FIG. 1 is a sectional view showing a main portion for explaining an embodiment of the bearing unit of the present invention. FIG. 2 is a perspective view showing a state in which a retainer plate is engaged and fixed onto an outer circumferential face of a small diameter step portion of an outer ring. FIG. 3 is a perspective view taken from the back side of FIG. 2. FIG. 4 is a sectional view of a main portion for explaining a step in which an engagement pawl is formed in an inner circumferential portion of a retainer plate. FIG. 5 is a sectional view of a main portion for explaining a step in which a retainer plate is engaged with a small diameter step portion of an outer ring. FIG. 6 is a sectional view of a main portion for explaining a state in which an engagement pawl of a retainer plate is engaged with an engagement groove of an outer ring.

As shown in FIG. 1, the bearing unit 10 of the first embodiment includes: a rolling bearing 11; and a retainer plate 12 engaged with an outer circumferential face of the rolling bearing 11 so that the rolling bearing 11 can be fixed to a housing (not shown).

The rolling bearing 11 includes: an outer ring 13 having an outer ring raceway face 13a on the inner circumferential face; an inner ring 14 having an inner ring raceway face 14a on the outer circumferential face; a plurality of rolling elements 15 which are disposed between the inner ring raceway face 14a and the outer ring raceway face 13a so as to be rotatable in the circumferential direction; a cage 16 for holding the plurality of rolling elements 15 at substantially regular intervals in the circumferential direction; and sealing members 17, which are respectively attached to both axial ends of inner circumferential portions of the outer ring 13, for sealing gaps formed between the bearing space and the outside.

On an outer circumferential face at an end axial portion of the outer ring 13, a small diameter step portion 18, which is engaged with the retainer plate 12, is formed. An engagement groove 19 is formed all over the circumference in the circumferential direction on the outer circumferential face of the small diameter step portion at axially inside area. In this connection, between the small diameter step portion 18 and the outer circumferential face of the outer ring, an end face 18a of the small diameter step portion 18 is formed. The engagement groove 19 described above is continuously provided from this end face 18a of the small diameter step portion 18 to the outer circumferential face of the outer ring.

On the other hand, as shown in FIGS. 2 and 3, the retainer plate 12 is formed into a substantially triangular flange shape. On the vicinities of three vertexes of the triangular shape, insertion holes 20, into which bolts (not shown) are inserted, are formed. Note that, only the outer ring 13 of the rolling bearing 10 is shown in FIGS. 2 and 3 for the sake of convenience.

As shown in FIGS. 1 and 3, in the inner circumferential portion of the retainer plate 12, a retainer hole for holding the outer ring 13 is provided and an engagement pawl 21, which is engaged with the engagement groove 19 formed in the small diameter step portion 18 of the outer ring 13, is formed so as to protrude to radially inward of the retainer hole. In the first embodiment, three engagement pawls 21 are formed to be arranged at substantially regular intervals in the circumferential direction. The three engagement pawls 21 are respectively arranged on the three vertex sides of the triangular shape of the retainer plate 12.

Next, referring to FIGS. 4 to 6, an assembling method of the bearing unit 10 will be explained below.

In the first embodiment, before the retainer plate 12 is engaged with the small diameter step portion 18 of the outer ring 13, the engagement pawls 21 are previously formed in the inner circumferential portion of the retainer hole of the retainer plate 12.

That is, as shown in FIG. 4, three portions of the circumferential edge of the inner circumferential portion of the retainer hole of the retainer plate 12, which are arranged at regular intervals in the circumferential direction, are pressed and deformed in the axial direction by a press machine etc., so that the material in the circumferential portion is swelled out from the inner circumferential face of the retainer plate 12 to radially inward. In this way, the engagement pawls 21 are formed. Positions of the forward end portions of the engagement pawls 21 are arranged at the substantially central portion in the axial direction of the inner circumferential portion of the retainer plate 12.

A diameter of the inner circumferential edge of the end portion on the opposite side to the pressing position described before of the retainer plate 12 is substantially the same as the diameter of the inner circumferential face before pressing. The inner circumferential edge of the end portion and the forward end of the engagement pawl 21 are connected to each other by the concave surface 22 smoothly swelling out radially inward.

As shown in FIG. 5, when the inner circumferential portion of the retainer hole of the retainer plate 12 is engaged with the small diameter step portion 18 of the outer ring 13 from the concave surface 22 side, the engagement pawl 21 gets over the outer circumferential face from the end face of the small diameter step portion 18 of the outer ring 13 to the engagement groove 19, so that the engagement pawl 21 can be engaged with the engagement groove 19 as shown in FIG. 6. In this way, the bearing device 10 is assembled.

As explained above, according to the bearing unit 10 of the first embodiment, when the retainer plate 12 is engaged with the small diameter step portion 18 of the outer ring 13, the engagement pawl 21, which has been previously formed in the inner circumferential portion of the retainer hole of the retainer plate 12, is engaged with the engagement groove 19 of the small diameter step portion 18. Therefore, at the time of assembling the bearing unit 10, it is unnecessary to check whether or not the engagement pawls 21 are properly formed in the inner circumferential portion of the retainer plate 12. Accordingly, the efficiency of the assembling work of the bearing unit 10 is enhanced and the productivity can be improved.

For example, in the first embodiment, three engagement pawls 21 are formed in the inner circumferential portion of the retainer plate 12. However, it should be noted that the present invention is not limited to the above specific example. Four or more engagement pawls 21 may be formed in the inner circumferential portion of the retainer hole of the retainer plate 12.

In the above embodiment, the engagement groove 19 is formed all over the circumference in the circumferential direction of the small diameter step portion 18. However, it should be noted that the present invention is not limited to the above specific example. For example, engagement grooves extending in the circumferential direction may be formed in a plurality of portions on the outer circumferential face of the small diameter step portion 18.

Second Embodiment

Figure 7:
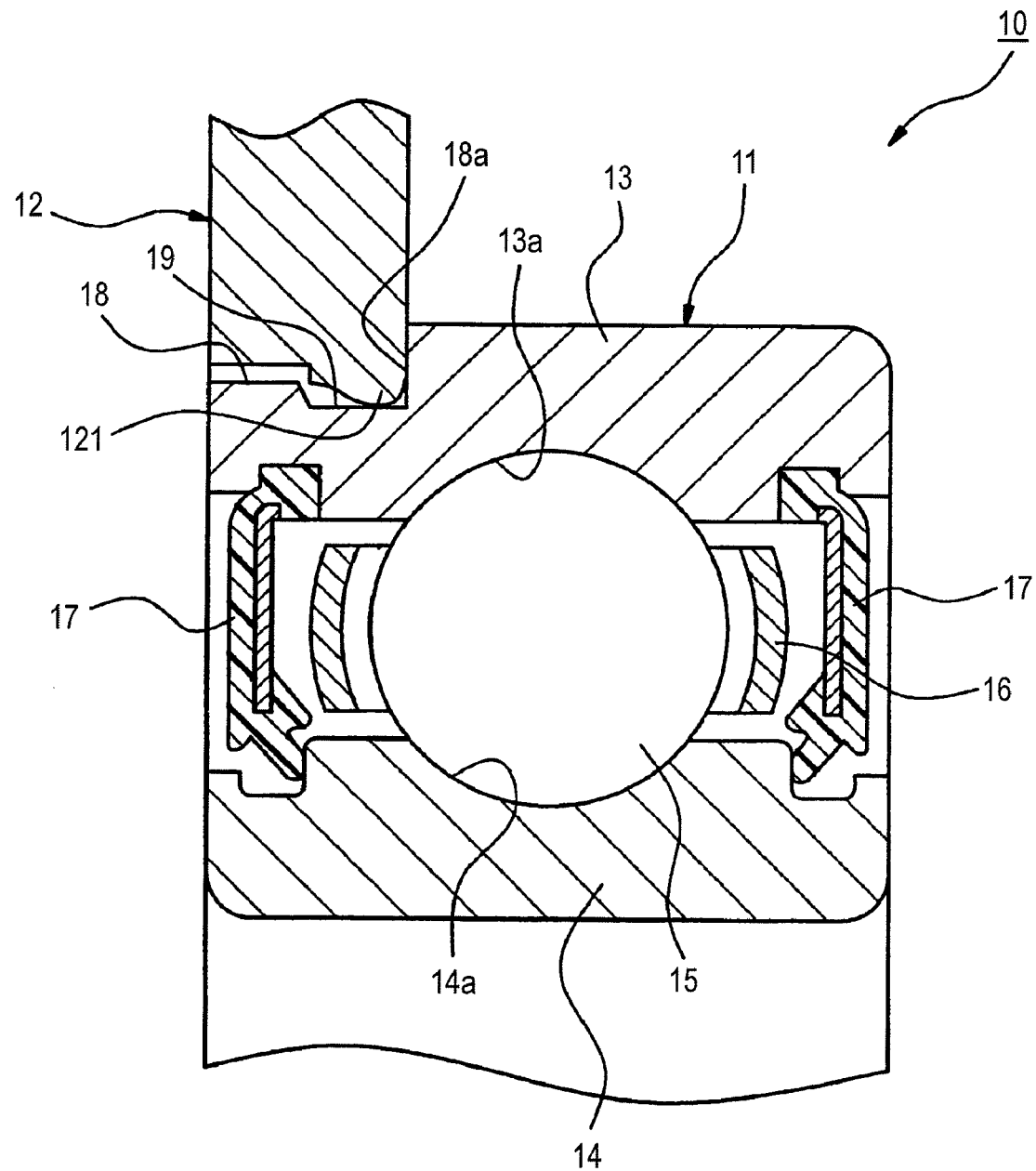
FIG. 7 is a sectional view of a main portion for explaining an embodiment of a bearing unit of the present invention.

Referring to FIGS. 7 and 8, the second embodiment of the present invention will be explained in detail below.

FIG. 7 is a sectional view of a main portion for explaining an embodiment of a bearing unit of the present invention. FIG. 8 is a schematic illustration for explaining a step in which an outer ring of a rolling bearing and a retainer plate are combined with each other.

Different points of the second embodiment from the first embodiment are the forming method of engagement pawls 121 and the fixing method of the retainer plate 12 and the rolling bearing 11 in which the engagement pawls 121 are used. Except for the above points, the constitution of the rolling bearing 11 and the retainer plate 12 of the second embodiment is substantially the same as that of the first embodiment. Like reference marks are used to indicate like members in the first and the second embodiment and the detailed explanations are omitted here.

Referring to FIG. 8, an assembling method of the bearing unit 10 of the second embodiment will be explained. In the second embodiment, after the retainer plate 12 has been contacted with the end face 18a of the small diameter step portion 18 of the outer ring 13, the engagement pawls 121 are formed in the inner circumferential portion of the retainer plate 12 through a plastic working process executed by a press machine etc., and the outer ring 13 of the rolling bearing 11 and the retainer plate 12 are combined with each other.

Figure 8B:
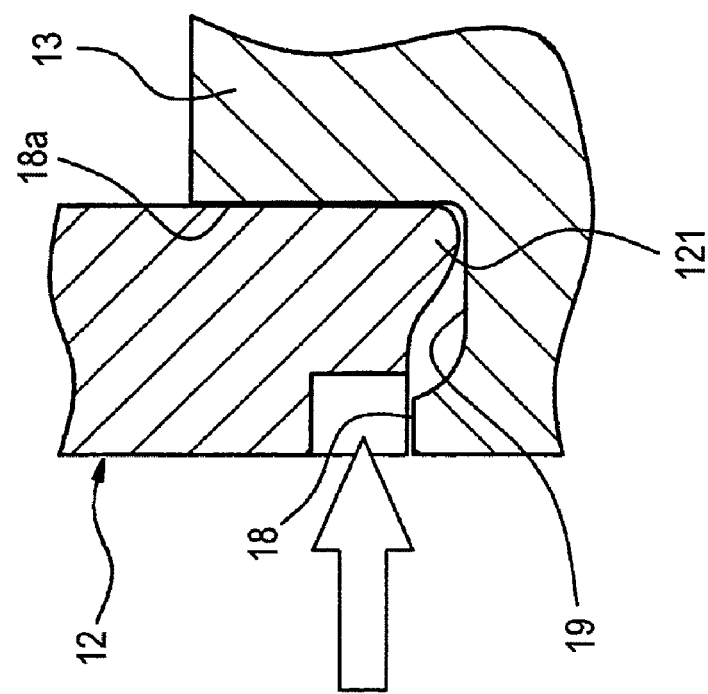
FIG. 8B is a sectional view of a main portion showing a state after the outer ring of the rolling bearing and the retainer plate have been combined with each other.
Figure 8A:
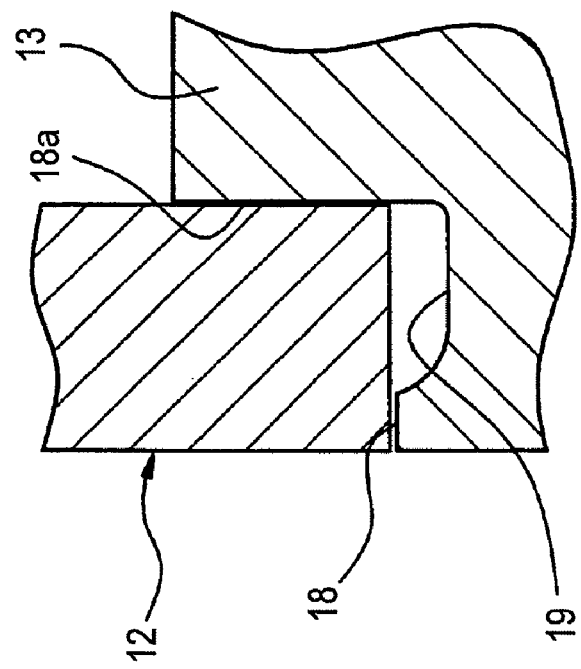
FIG. 8A is a sectional view of a main portion showing a state before the outer ring of the rolling bearing and the retainer plate are combined with each other.

That is, as shown in FIG. 8A, after the end axial portion of the retainer plate 12 has been contacted with the end face 18a of the small diameter step portion 18 of the outer ring 13, a plurality of portions in the circumferential direction of the inner circumferential edge of the inner circumferential portion of the retainer hole of the retainer plate 12 are pressed in the axial direction against the end face 18a of the small diameter step portion 18 by a press machine etc. When the above pressing process is executed, as shown in FIG. 8B, the material at contacting portions, with which the end face 18a of the small diameter step portion 18 contacts, at a plurality of positions in the circumferential direction of the circumferential edge of the inner circumferential portion of the retainer hole of the retainer plate 12 is swelled radially inward so as to form the engagement pawls 121. The thus formed engagement pawls 121 are engaged with the engagement groove 19 of the small diameter step portion 18. Due to the foregoing, the outer ring 13 of the rolling bearing 11 and the retainer plate 12 are combined with each other and the bearing unit 10 is assembled.

As explained above, according to the bearing unit 10 of the second embodiment, after the retainer plate 12 has been engaged with the small diameter step portion 18 of the outer ring 13, the circumferential edge of the inner circumferential portion of the retainer hole of the retainer plate 12 is pressed in the axial direction against the end face 18a of the small diameter step portion 18 by a press machine. Therefore, the engagement pawls 12 are formed in the inner circumferential portion of the retainer plate 12, so that the outer ring 13 of the rolling bearing 11 and the retainer plate 12 can be combined with each other. Accordingly, at the time of assembling the bearing unit 10, the plastic working step may be executed only once. Accordingly, the efficiency of the assembling work of the bearing unit 10 can be enhanced and the productivity can be improved.

For example, in the above embodiment, three engagement pawls 121 are formed in the inner circumferential portion of the retainer plate 12. However, it should be noted that the present invention is not limited to the above specific example. Two engagement pawls 121 or four or more engagement pawls 121 may be formed in the inner circumferential portion of the retainer plate 12.

In the above embodiment, the engagement groove 19 is formed all over the circumference in the circumferential direction of the small diameter step portion 18. However, it should be noted that the present invention is not limited to the above specific example. For example, engagement grooves extending in the circumferential direction may be formed in a plurality of portions on the outer circumferential face of the small diameter step portion 18.

Third Embodiment

Figure 9:
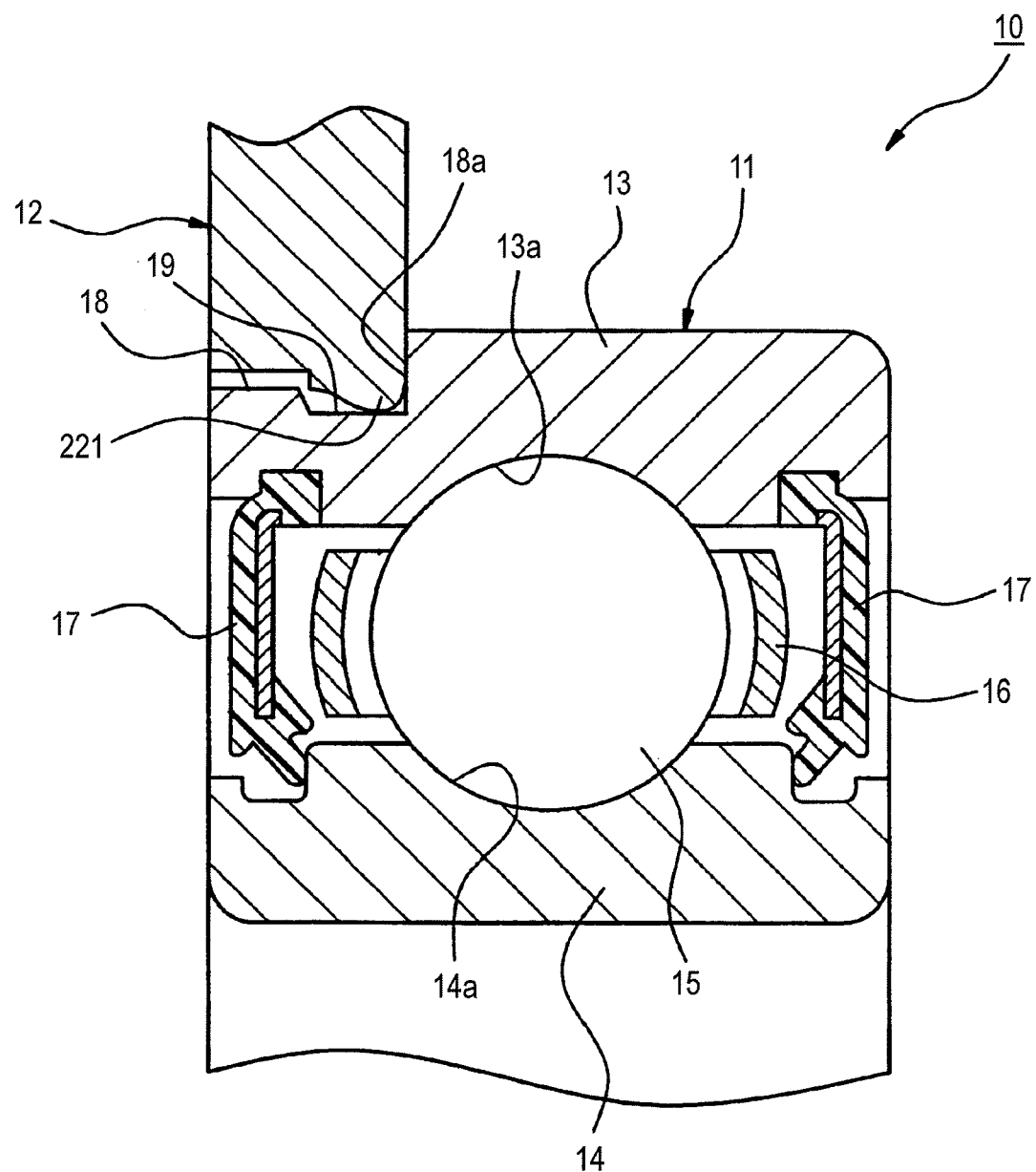
FIG. 9 is a sectional view of a main portion for explaining an embodiment of a bearing unit of the present invention.

Referring to FIGS. 9, 10 and 11, the third embodiment of the present invention will be explained in detail below.

FIG. 9 is a sectional view of a main portion for explaining an embodiment of a bearing unit of the present invention. FIG. 10 is a schematic illustration for explaining a step in which a protruding portion is formed on a retainer plate. FIG. 11 is a schematic illustration for explaining a step in which an outer ring of a rolling bearing and a retainer plate are combined with each other.

Different points of the third embodiment from the first and the second embodiment are the forming method of the engagement pawls 221 and the fixing method of the retainer plate and the rolling bearing 11 in which the engagement pawls 221 are used. Except for the above points, the constitution of the rolling bearing 11 and the retainer plate 12 of the third embodiment is substantially the same as that of the first and the second embodiment. Like reference marks are used to indicate like members and the detailed explanations are omitted here.

Referring to FIGS. 10 and 11, an assembling method of the bearing unit 10 will be explained below. In the third embodiment, before the retainer plate 12 is engaged with the small diameter step portion 18 of the outer ring 13, the protruding portions 12a protruding in the axial direction are previously formed in the inner circumferential portion of the retainer plate 12.

Figure 10A:
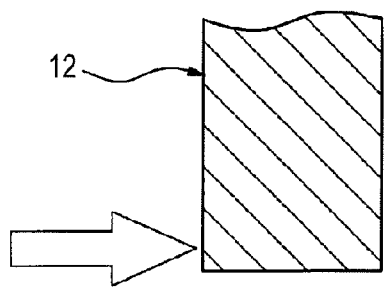
FIG. 10A is a sectional view of a main portion showing a state before the protruding portion is formed.
Figure 10B:
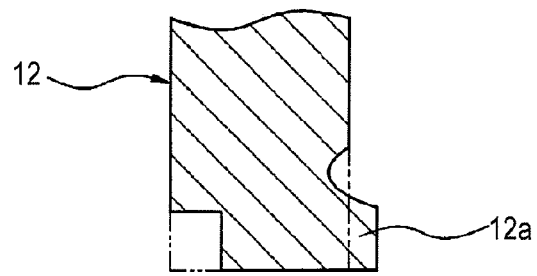
FIG. 10B is a sectional view of the main portion showing a state after the protruding portion has been formed.

As shown in FIG. 10A, when three portions of the circumferential edge of the inner circumferential portion of the retainer hole of the retainer plate 12, which are located at regular intervals, are pressed in the axial direction by a press machine, as shown in FIG. 10B, the material of the circumferential edge portion is swelled out in the axial direction from one axial end face of the retainer plate 12. In this way, the protruding portions 12a are formed in the inner circumferential portion of the retainer plate 12.

Figure 11A:
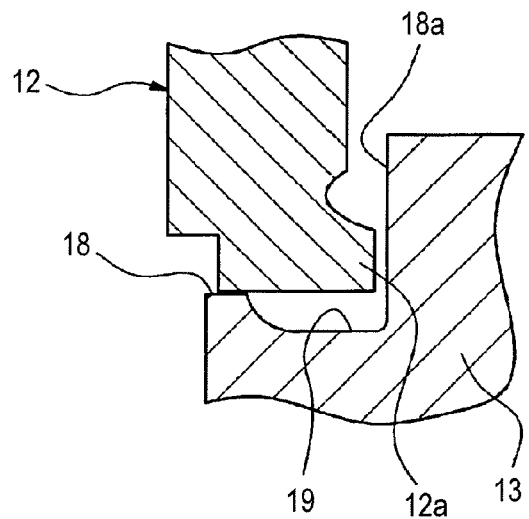
FIG. 11A is a sectional view of a main portion showing a state before the outer ring of the rolling bearing and the retainer plate are combined with each other.

As shown in FIG. 11A, the protruding portions 12a are contacted with the end face 18a of the small diameter step portion 18.

Figure 11B:
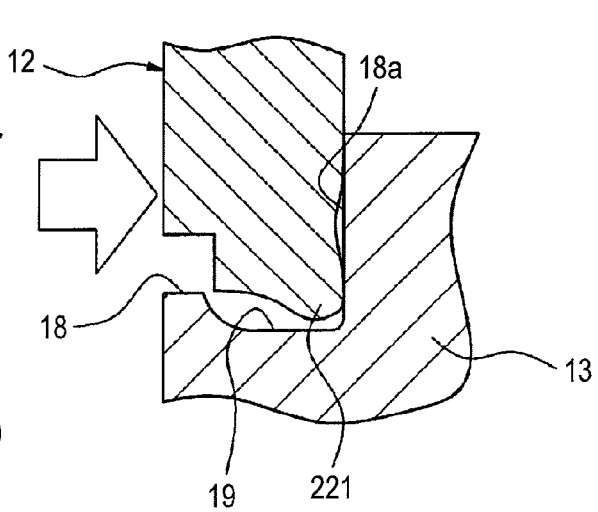
FIG. 11B is a sectional view of a main portion showing a state before the outer ring of the rolling bearing and the retainer plate have been combined with each other.
Figure 12:
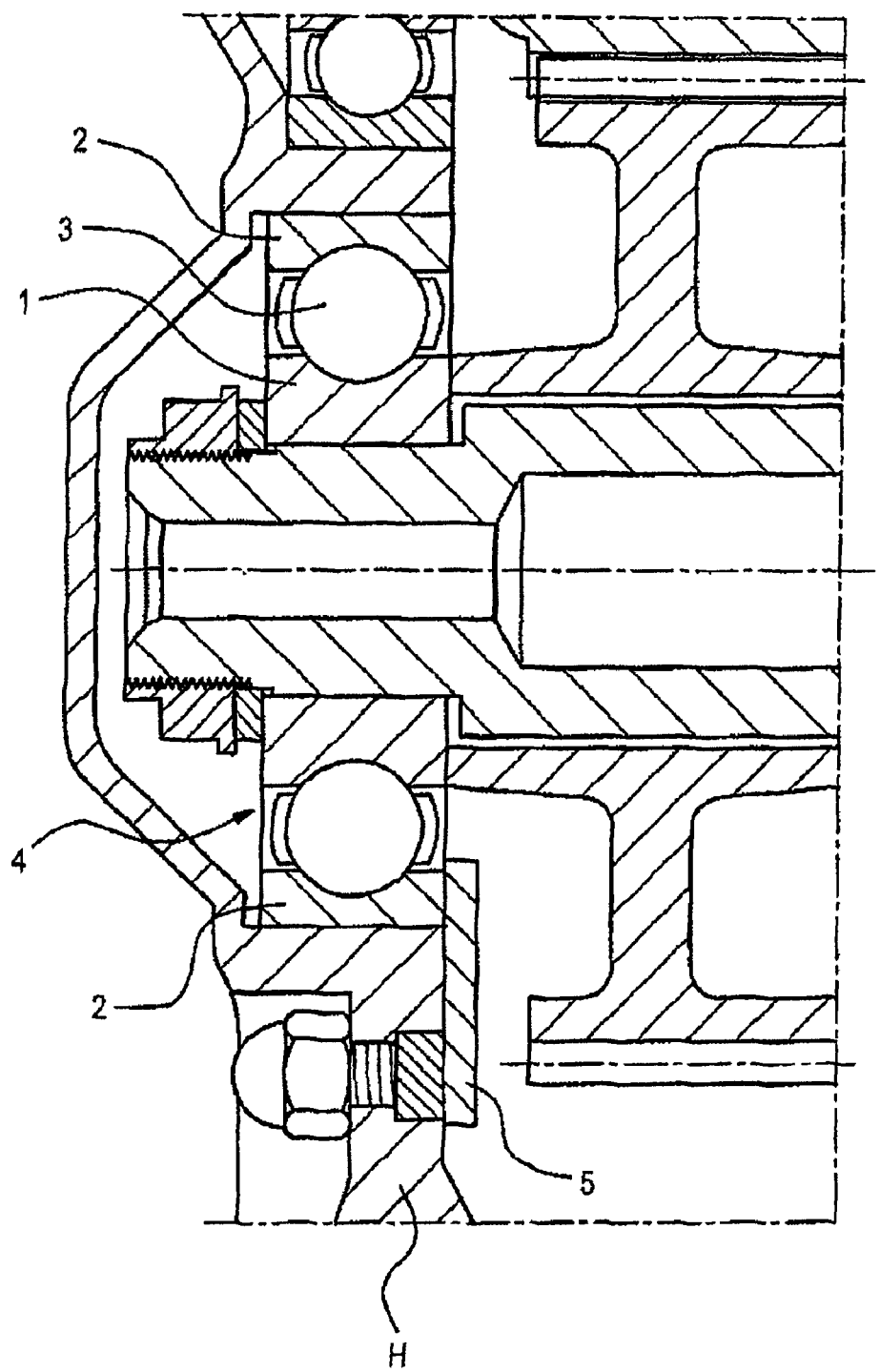
FIG. 12 is a sectional view of a main portion for explaining a conventional bearing unit and FIG. 13 is a sectional view of a main portion for explaining another conventional bearing unit.
Figure 13:
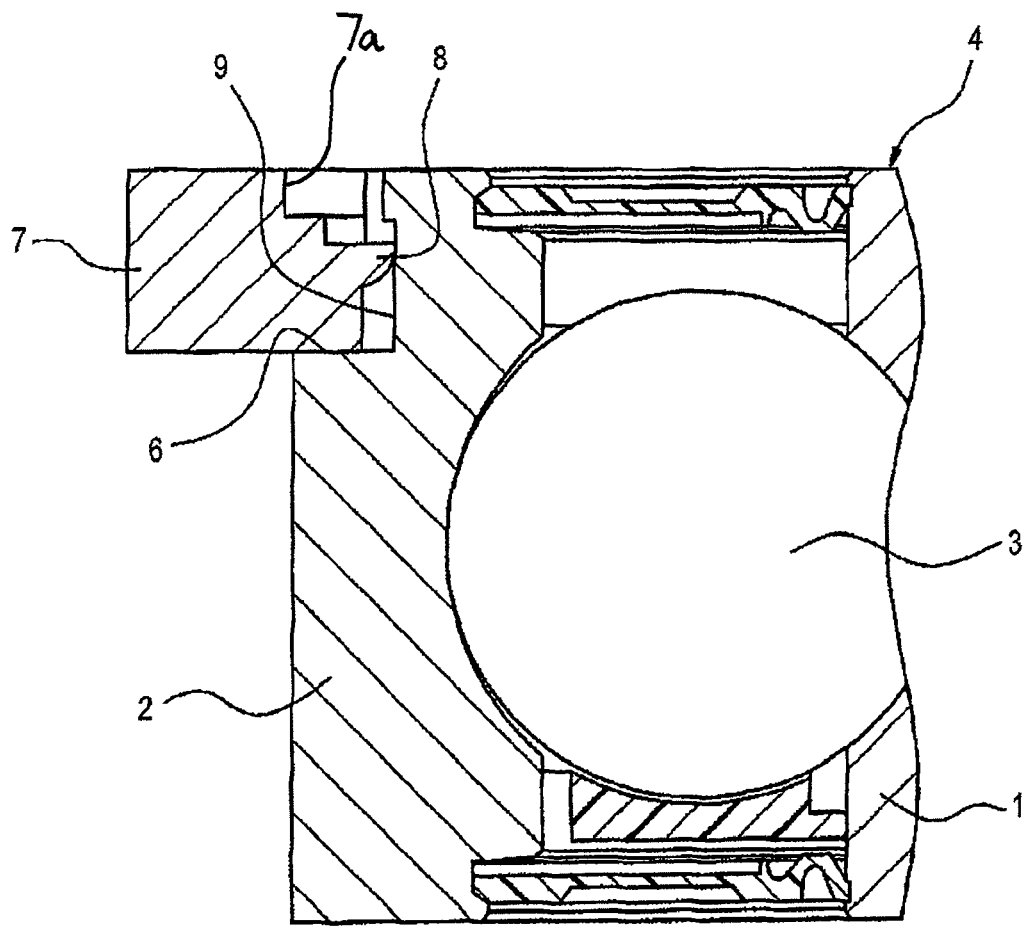

Under this condition, as shown in FIG. 11B, the axial end face of the retainer plate 12 located on the opposite side to the protruding portions 12a of the retainer plate 12 is pressed to the small diameter step portion 18 side by a press machine and the protruding portions 12a are pressed against the end face 18a of the small diameter step portion 18. In this way, the protruding portions 12a are plastically deformed radially inward. By this plastic deformation, the engagement pawls 221 protruding radially inward are formed in the inner circumferential portion of the retainer hole of the retainer plate 12 and the engagement pawls 221 are engaged with the engagement groove 19 formed on the small diameter step portion 18 side. Thus, the outer ring 13 of the rolling bearing 11 and the retainer plate 12 are combined with each other and the bearing unit 10 is assembled.

As explained above, according to the bearing unit 10 of the third embodiment, three protruding portions 12a protruding in the axial direction are previously formed at regular intervals in the circumferential direction of the circumferential edge of the inner circumferential portion of the retainer hole of the retainer plate 12. While the protruding portions 12a are being directed to the end face 18a side of the small diameter step portion 18 of the outer ring 13, the retainer plate 12 is engaged with the small diameter step portion 18 and then the axial end face of the retainer plate 12 on the opposite side to the protruding portion 12a is pressed in the axial direction. In this way, three engagement pawls 221 are simultaneously formed at regular intervals in the circumferential direction of the circumferential edge of the inner circumferential portion of the retainer hole of the retainer plate 12 and the engagement pawls 221 can be engaged with the engagement groove 19 on the small diameter step portion 18 side. Thus, it is possible to enhance the efficiency of the assembling work of the bearing unit 10 and the productivity can be improved.

For example, in the above embodiment, three engagement pawls 221 are formed in the inner circumferential portion of the retainer plate 12. However, it should be noted that the present invention is not limited to the above specific example. Four or more engagement pawls 221 may be formed in the inner circumferential portion of the retainer plate 12.

In the above embodiment, the engagement groove 19 is formed all over the circumference in the circumferential direction of the small diameter step portion 18. However, it should be noted that the present invention is not limited to the above specific example. For example, engagement grooves extending in the circumferential direction may be formed in a plurality of portions on the outer circumferential face of the small diameter step portion 18.

In this connection, the constitution of the present invention, which includes the inner ring, outer ring, rolling elements, retainer plate, protruding portions, engagement groove, engagement pawls and small diameter portion, is not limited to the specific example shown in the first to the third embodiment. Variations can be made without departing from the scope and spirit of the present invention.

What is claimed is:

1. An assembling method of a bearing unit which comprises a bearing having an outer ring and a retainer plate having a retainer hole for holding the outer ring, the assembling method comprising:
    bringing an axial end face of the retainer plate to contact with an end face of a small diameter step portion provided in an axial end portion of an outer circumferential face of the outer ring; and
    after bringing the axial end face of the retainer plate into contact with the end face of the small diameter step portion, pressing a plurality of portions of a circumferential edge of an inner circumferential portion of the retainer hole of the retainer plate against the end face of the small diameter step portion of the outer ring so as to form engagement pawls contacting with the end face of the small diameter step portion and protruding radially inward of the bearing unit, to thereby engage the engagement pawls of the retainer plate with an engagement groove continuously provided at the end face of the small diameter step portion of the outer ring.

2. The assembling method according to claim 1, wherein the pressing step is performed in an axial direction of the bearing unit, so that the plurality of portions are pressed against the end face of the small diameter step portion.

3. The assembling method according to claim 1, wherein the pressing step causes material at the plurality of portions pressing against the end face of the small diameter step portion to swell radially inward so as to form the engagement pawls engaging with the engagement groove.

* * * * *